…

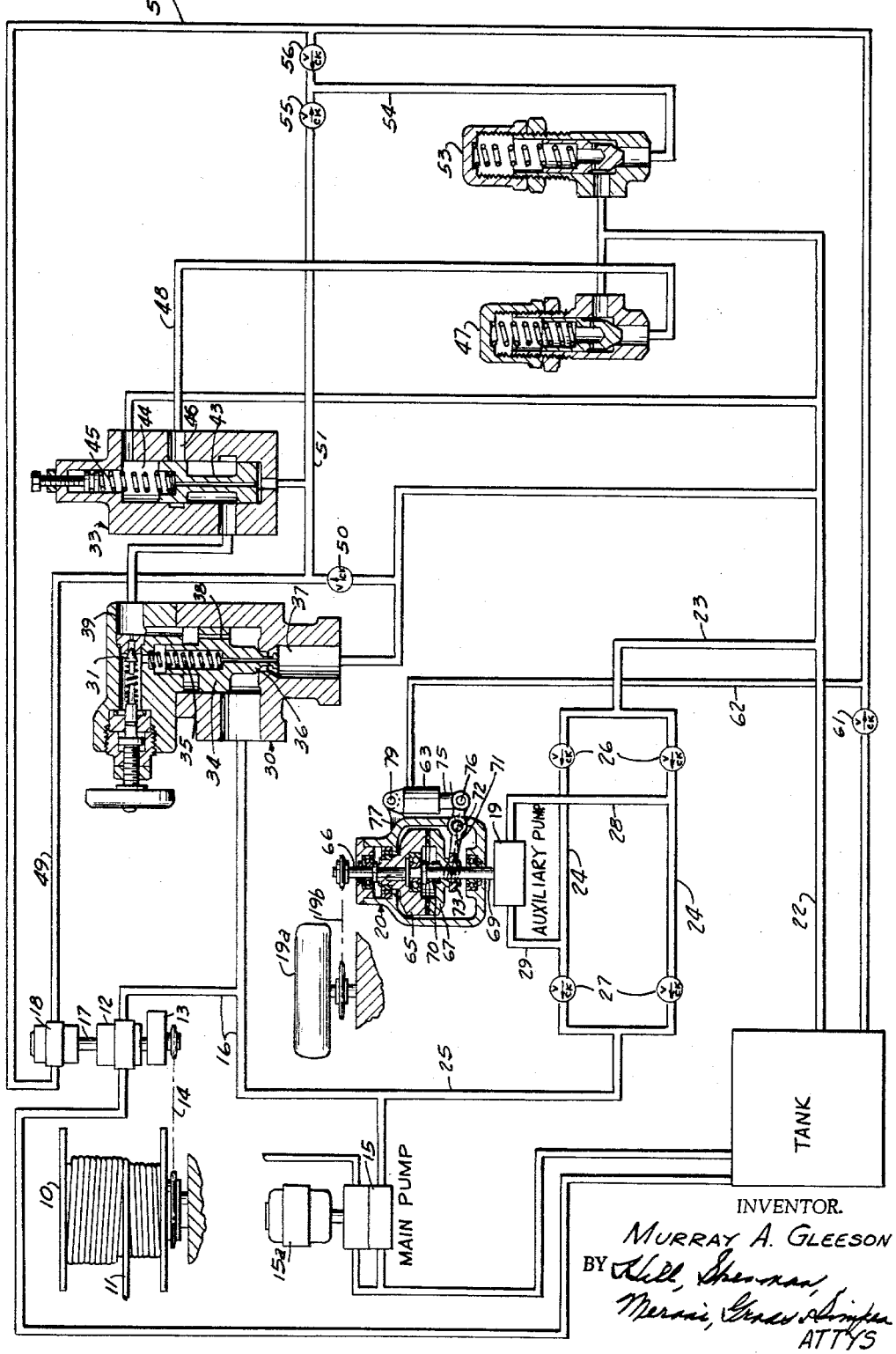

United States Patent Office 3,250,490
Patented May 10, 1966

3,250,490
HYDRAULIC CABLE REEL DRIVE CIRCUIT
Murray A. Gleeson, Downers Grove, Ill., assignor to Goodman Manufacturing Company, Chicago, Ill., a corporation of Illinois
Filed Sept. 21, 1964, Ser. No. 397,682
7 Claims. (Cl. 242—86.51)

This invention relates to improvements in hydraulic drives and control circuits for cable reels supplying hydraulic power to wheeled vehicles.

A principal object of the present invention is to provide an improved form of hydraulic cable reel drive, winding in and paying out a cable supplying power to a wheeled vehicle, in which multiple pumps supply hydraulic fluid to the cable reel during the winding operation and in which the problem of unloading the auxiliary pump during unwinding is avoided.

A further object of the invention is to improve upon the hydraulic cable reel drives driving the reel to wind in and pay out a cable supplying electric power to a wheeled vehicle, and maintaining a relatively uniform tension on the cable during the paying off and winding in of the cable, by the use of two hydraulic pumps, one of which is a relatively low capacity constantly driven pump and the other of which is a relatively high capacity reversible pump, driven to sense the speed of travel of the vehicle and the need to increase the speed of the cable reel to maintain the tension of the cable at a predetermined value, and disconnecting the auxiliary pump from its drive system during unwinding of the cable under the control of a sensor, sensing the direction of rotation of the cable reel.

Another object is to provide an improved hydraulic cable reel drive, winding in and paying out electric cable supplying power to an electrically propelled vehicle, in which multiple pumps supply fluid to effect the winding in of cable and one pump is continuously driven to supply fluid to wind in the cable and maintain tension on the cable during unwinding and when the vehicle is standing, and the other pump is driven from a wheel of the vehicle to supply fluid under pressure to augment the supply of fluid under pressure to wind in cable, as fluid is needed to maintain the required tension on the cable, and is ineffective to supply fluid under pressure during the paying out of cable.

Still another object of the invention is to provide a hydraulic drive and control system for a cable reel mounted on a vehicle and having a cable paid off or wound thereon and connected to a source of power by a fixed nip, in which the vehicle moves toward and from and past the fixed nip and hydraulic power is supplied to wind in and pay off the cable in accordance with the direction of travel of the vehicle toward or from the fixed nip by multiple pumps, one of which is a low capacity pump and is continuously driven during operation of the reel and the other of which is a wheel driven high capacity reversible pump, in which a sensor sensing the direction of rotation of the reel disconnects the wheel driven pump from the drive wheel therefor, regardless of the direction of rotation of the wheel as the direction of rotation of the reel changes from a winding to an unwinding direction whereby the auxiliary pump supplies no fluid when not needed.

A still further object of the invention is to improve upon the cable reel drives for driving a reel to wind on and pay off cable supplying power to an electrically propelled vehicle carrying the reel, in which a continuously driven low capacity main pump supplies fluid under pressure to the cable reel drive motor, and an auxiliary high capacity reversible pump augments the supply of fluid under pressure to the cable reel drive motor during winding, in which the auxiliary pump is driven from a wheel of the vehicle through a clutch controlled by a sensor, sensing the direction of rotation of the reel and effective to disengage the clutch during rotation of the reel in an unwinding direction and thereby render the auxiliary pump ineffective to supply fluid under pressure when not needed.

These and other objects of the invention will appear from time to time as the following specification proceeds and with reference to the accompanying drawing wherein the figure of the drawing is a diagrammatic view illustrating a form of fluid pressure reel operating circuit arranged in accordance with the principles of the present invention.

In the embodiment of the invention illustrated in the drawing, I have shown a cable reel 10 having an electric cable 11 wound thereon, which may be connected with a source of electric power by a fixed nip at the free end of the cable clamped to a power line. The reel may be mounted on a mine vehicle, such as a shuttle car, which is adapted to move toward and past the fixed nip during the operation of transferring a load of material from a loading to a discharge station.

The cable reel 10 may be of a conventional form and is diagrammatically shown as driven from a fluid pressure motor 12 driving a speed reducer 13 having driving connection with the cable reel through a chain and sprocket drive 14. A main fluid pump 15 is driven by an electric motor 15a and supplies hydraulic fluid under pressure to the reel motor 12 through a main pressure line 16. The reel motor 12 has a motor shaft 17 extending from opposite ends thereof, one end of which drives the speed reducer 13 and the cable reel 10 and the opposite end of which drives a sensor 18, which may be a reversible pump, like the cable reel motor, and senses the direction of rotation of said motor and the cable reel 10.

An auxiliary high capacity pump 19 is shown as driven from a wheel 19a of the vehicle through a chain and sprocket drive 19b and a clutch 20, controlled by the sensor 18 in a manner which will hereinafter more clearly appear as this specification proceeds.

The auxiliary pump 19 is supplied with hydraulic fluid through a tank line 22 having an intake line 23 leading therefrom and shown in FIGURE 1 as branching into parallel lines 24, 24. The lines 24 are connected at their ends opposite from the intake line 23 to a pressure line 25 leading to the pressure line 16 for supplying fluid under pressure to the motor 12. A check valve 26 is provided in each line 24. Said check valves are set to accommodate the flow of fluid from the intake line 23 to the auxiliary pump through either of the lines 24, 24, but to block the back flow of fluid to the line 23.

A pair of check valves 27, 27 is also provided in the lines 24 and spaced downstream of the check valves 26, 26 and set to accomodate the flow of fluid under pressure to the pressure line 25 and to block the return of fluid to the lines 24, 24. An intake line 28 leads from one of the lines 24 downstream of the check valves 26 to the pump 19 and forms an intake for said pump during one direction of rotation thereof, and a discharge outlet from said pump during an opposite direction of rotation thereof. A line 29 connects the opposite line 24 with the opposite side of the pump 19 from the line 28, and serves as either a pressure or intake line depending upon the direction of rotation of the pump 19.

Thus in one direction of rotation of the pump 19, fluid will be drawn into the pump through the line 29 and will be discharged from the pump under pressure through the line 28 past the associated check valve 27 into the pressure lines 25 and 16. In an opposite direction of rotation of the pump the line 28 will form the intake line and the line 29 will form the pressure line.

The pressure line 16 has connection with a pilot-operated relief valve 30, downstream of the connection of the pressure line 25 to the pressure line 16. The pilot-operated relief valve 30 may be of a conventional form like that shown and described in an application Serial No. 175,095 filed February 23, 1962, and now Patent No. 3,158,365, so need not be shown and described in detail herein.

As described in application Serial No. 175,095, the pilot-operated relief valve 30 is automatically controllable to relieve the main pressure line 16 at a high pressure range which may be in the order of 500 p.s.i. under the control of a manually adjustable poppet valve 31 during the drawing in of cable by the reel 10, or may relieve the main pressure line 16 at a lower pressure range during the paying off of cable from the reel 10, under the control of a pilot-operated diverting valve 33.

The pilot-operated relief valve 30 has a balanced piston 34 movable along the valve chamber against a spring 35. The piston 34 has a valve 36 connected thereto and cooperating with a port 37 to relieve pressure in the pressure line 16, and return fluid back to tank through the return or tank line 22.

The piston 34 also has a balancing passageway 38 leading therethrough to effect the balancing of pressure on opposite sides of said piston. A port 39 in communication with the poppet valve 31 and on the opposite side of the piston 34 from the valve 36 has communication with the inlet end of the pilot-operated diverting valve 33.

The pilot-operated diverting valve 33 has a valve piston or spool 43 movable along a valve chamber 44 and biased by a spring 45, to block the flow of fluid through an outlet port 46 of said valve. The port 46 is connected with a low pressure relief valve 47 through a pressure line 48. The low pressure relief valve 47 may be set to relieve pressure at the low pressure relief range of the pilot-operated relief valve 30 during the paying out of cable from the reel 10, to return fluid from the line 48 to the tank line 22 through said low pressure relief valve, and to maintain a predetermined back pressure on the piston 34 of the pilot-operated relief valve 30 and, therefore, determine the low pressure relief range of the pilot-operated relief valve 30.

The piston of the pilot-operated diverting valve 33 is moved against the spring 45 during the paying off of cable from the reel 10 by pressure supplied the sensor 18 driven by the reel during unwinding of the cable. During the paying off of cable, the sensor 18 supplies pressure through a line 49 having a check valve 50 therein, disposed downstream of a connecting line 51, having fluid pressure connection with the bottom of the piston 43. A pressure line 54 connects the line 51 with the back pressure valve 53. Check valves 55 and 56 are provided on opposite sides of the juncture of the line 51 to the line 54. The check valve 55 is set to accommodate the flow of fluid under pressure from the line 51 to the line 54 to the back pressure valve 53. The check valve 56 is set to block the flow of fluid under pressure from the line 51 to a line 57, connected to the opposite side of the sensor 18 from the line 49, and forming a pressure line when the sensor 18 is driven by the motor 12 during the winding operation.

The back pressure valve 53 may be set to open at a pressure range of 150 p.s.i. and is provided to provide sufficient pressure in the line 51 to effect movement of the valve spool 43 against its spring 45 into a position to accommodate the flow of fluid through the port 46 and line 48 to the low pressure relief valve 47, when the reel is paying off cable. During the operation of paying off cable, the pilot-operated relief valve 30 will thus dump its fluid to tank at the pressure setting of the low pressure relief valve 47, which may be in the range of 200 p.s.i.

The line 57 has a suction check valve 61 therein blocking the flow of fluid through said line when the reel motor 12 is driving the sensor 18 to pressurize the line 57. A pressure line 62 leads from the line 57 upstream of the check valve 61 and has fluid pressure connection with a cylinder 63, for engaging the clutch 20 and holding the clutch in engagement during the operation of drawing cable in on the reel 10.

The clutch 20 may be of any conventional form, and is diagrammatically shown as including a driving member 65 driven from a shaft 66 driven from the chain and sprocket drive 19b. A driven member 67 is shown as being slidably mounted on a drive shaft 69 for the pump 19, and may be suitably connected to said drive shaft, to drive said shaft 69 and the pump 19 from the vehicle wheel 19a, whenever the reel is rotating in a direction to wind in cable.

A spring 70 is diagrammatically shown as being interposed between the members 65 and 67 to disengage the clutch during the unwinding operation, when fluid from the auxiliary pump is not needed. A clutch yoke 71 is shown as being operable to engage the clutch. The clutch yoke 71 is pivoted to the casing for the clutch intermediate its ends on a pivot pin 72 and extends along opposite sides of a clutch collar 73 on the driven member 67, and is suitably connected thereto for engaging the clutch and holding the clutch engaged.

The clutch yoke 71 is pivotally connected at its outer end to a piston rod 75 extending from the cylinder 63 of a hydraulic cylinder and piston. A transverse pivot pin 76 is provided to pivotally connect the piston rod 75 to the outer end of the clutch yoke 71. The cylinder 63 is in turn pivotally connected at its head end to a bracket 77 extending outwardly of the housing of the clutch, on a pivot pin 79.

Where the vehicle is advancing toward the nip and drawing in its cable, the main low capacity pump 15 will be continuously driven by the electric motor 15a. The auxiliary high capacity pump 19 will also be driven by the vehicle wheel 19a through the clutch 20, engaged by the application of fluid under pressure to the cylinder 63, by pressure derived from the sensor 18, pressurizing the line 57 at a pressure determined by the setting of the back pressure valve 53, which may be in the order of 150 p.s.i.

The main pump 15 will thus direct its output through the line 16 to the reel motor 12 during winding, providing sufficient speed to utilize the entire capacity of this pump. At the same time, the high capacity auxiliary pump also directs its output to the pressure line 16 and reel motor 12. The auxiliary pump 19 being driven at a speed commensurate with the torque requirements for drawing cable in on the reel 10, the combined outputs of the pumps 15 and 19 will be available to drive the reel motor 12 in a winding direction. Any excess is released to tank through the pilot-operated relief valve 30 at the high pressure setting of said relief valve, which may be in the order of 500 p.s.i.

As the vehicle is standing, the pump 19 will be standing and the main pump 15 will discharge its output through the pilot-operated relief valve 30 at the high pressure setting of said relief valve. The pressure supplied to the reel motor 12 by said main pump will lay against the reel motor and hold the cable 11 in a snug wound-up position.

During the unwinding operation, as cable is being paid off the reel 10 and the vehicle is traveling in a forward or reverse direction away from the point of connection of the nip to the source of power, the line 57 will serve as an intake line for the sensor pump 18. Fluid under pressure will then be released from the cylinder 63, and the spring 70 will disengage the clutch 20. The auxiliary pump 19 will then be cut out of operation. Pressure passing through the line 49 governed by the back pressure valve 53 will lift the valve spool 43 of the diverting valve 33, and effect the discharge of fluid through the port 46 of the pilot-operated diverting valve at the pressure setting of the low pressure relief valve 47, which may be in the order of 200 p.s.i. This will set the pilot-operated relief valve 30 to relieve pressure from the pressure line 16 at a low pressure which may be in the range of 200 p.s.i. The output of the capacity of the main pump 15 and the output from the reel motor 12, driven by the reel 10 as a pump, will then be fed into opposite ends of the pressure line 16 and discharged through the port 37 of the pilot-operated relief valve 30, at the low pressure setting of said relief valve.

While I have herein shown and described one form in which the invention may be embodied, it may readily be understood that various variations and modifications in the invention may be attained without departing from the spirit and scope of the novel concepts thereof.

I claim as my invention:

1. In a fluid pressure system for controlling the drawing in and paying out of a flexible member supplying electric power to a vehicle,
   a fluid pressure motor supplying the torque to draw in the member,
   said motor being driven as a pump by the member, during paying out of the member,
   a main pump,
   a motor for continuously driving said main pump,
   an auxiliary pump,
   a vehicle wheel for driving said auxiliary pump,
   a fluid pressure connection from said main pump to said fluid pressure motor,
   a fluid pressure connection from said auxiliary pump to said fluid pressure motor,
   sensor means sensing the direction of rotation of said fluid pressure motor,
   and a controlling connection from said sensor means to said auxiliary pump, effecting a drive to said auxiliary pump from said vehicle wheel upon rotation of said fluid pressure motor in a direction to draw in the flexible member,
   and rendering said auxiliary pump inoperative to effect a pumping operation during paying off of the flexible member.

2. In a fluid pressure system for controlling the drawing in and paying out of a flexible member supplying electric power to a vehicle,
   a fluid pressure motor supplying the power to draw in the member,
   said fluid pressure motor being driven by the member as a pump during paying out of the member,
   a main pump,
   an electric motor for continuously driving said main pump during operation of the vehicle,
   a fluid pressure connection from said main pump to said fluid pressure motor,
   an auxiliary pump,
   at least one vehicle wheel,
   a driving connection from said vehicle wheel to said auxiliary pump,
   a fluid pressure connection from said auxiliary pump to said fluid pressure motor,
   sensor means sensing the direction of rotation of said fluid pressure motor,
   a clutch for engaging and disengaging said driving connection,
   and an operative connection from said sensor means to said clutch effecting engagement of said clutch during the drawing in of a flexible member and the disengagement of said clutch during the paying out of the flexible member.

3. In a fluid pressure system for controlling the drawing in and paying out of a flexible member supplying the electric power to operate a vehicle having at least two drive wheels,
   a fluid pressure operated motor supplying the power to draw in the member,
   said fluid pressure motor being driven as a pump during paying out of the member,
   a main pump,
   an electric motor for continuously driving said main pump,
   an auxiliary pump,
   a drive connection from a vehicle wheel to said auxiliary pump for driving said auxiliary pump in accordance with the requirement for fluid under pressure,
   said drive connection including a clutch biased into a disengaged condition,
   fluid pressure connections from said main and auxiliary pumps to said fluid pressure motor for supplying fluid under pressure thereto, and
   a sensor pump driven by said fluid pressure motor and sensing the direction of rotation thereof and supplying the power to engage said clutch and effect a drive to said auxiliary pump during the drawing in of the flexible member.

4. A fluid pressure system in accordance with claim 3 in which a spring is provided to disengage the clutch and a fluid pressure cylinder and piston is provided to engage the clutch, wherein a pressure line is provided from said sensor pump to said cylinder to effect operation of said cylinder and piston and to engage said clutch when said fluid pressure motor is rotating in a direction to draw in the flexible member, and wherein a back pressure valve has connection with said fluid pressure connection leading from said sensor pump to said cylinder and piston, to maintain pressure in said fluid pressure connection sufficient to engage said clutch and hold said clutch in engagement.

5. In a cable reel mechanism for a vehicle adapted to be supplied with power from a fixed nip and adapted to move toward and away from and past said nip, characterized by cable reel mounted on said vehicle for movement therewith, a cable wound on said reel and connected to said nip for providing a power connection from said nip to said vehicle and adapted to be wound upon or paid off said reel when said vehicle moves toward or away from said nip, a tank, a main pump having its fluid input connected to said tank, an electric motor for continuously driving said main pump, a fluid motor-pump unit connected to said main pump and drivably connected to said reel and driven in one direction by fluid pressure from said main pump as a fluid motor for driving said reel to wind cable thereon, and driven in an opposite direction as a pump responsive to movement of said reel in a direction to pay off cable therefrom, control valve means for controlling the pressure of said pressure fluid in said main pressure line, the improvement comprising:
   an auxiliary pump,
   an auxiliary pressure line connecting the auxiliary pump to said main pressure line,
   a wheel driven drive connection to said auxiliary pump including a clutch,
   a fluid pressure cylinder and piston engaging said clutch,
   and a sensor pump sensing the direction of rotation of said reel and having fluid pressure connection with said cylinder and piston for engaging said clutch upon rotation of said reel in a direction to draw cable in on said reel.

6. A cable reel mechanism in accordance with claim 5 wherein fluid pressure connections are provided from said auxiliary pump to said pressure line, and wherein said fluid pressure connections have valve means associated therewith for effecting the supply of fluid under pressure to said pressure line in the same direction regardless of the direction of rotation of said auxiliary pump.

7. A cable reel mechanism in accordance with claim 5 wherein spring means are provided to disengage the clutch under the control of said sensor pump, during the paying out of cable by said cable reel, and wherein pressure is maintained to effect the engagement of said clutch during drawing in of the cable by a back pressure valve connected in said fluid pressure connection from said sensor pump to said cylinder and piston.

References Cited by the Examiner
UNITED STATES PATENTS
2,467,238   4/1949   Slomer _____ 242—86.51

MERVIN STEIN, *Primary Examiner.*
N. L. MINTZ, *Assistant Examiner.*